United States Patent Office 3,401,729
Patented Sept. 17, 1968

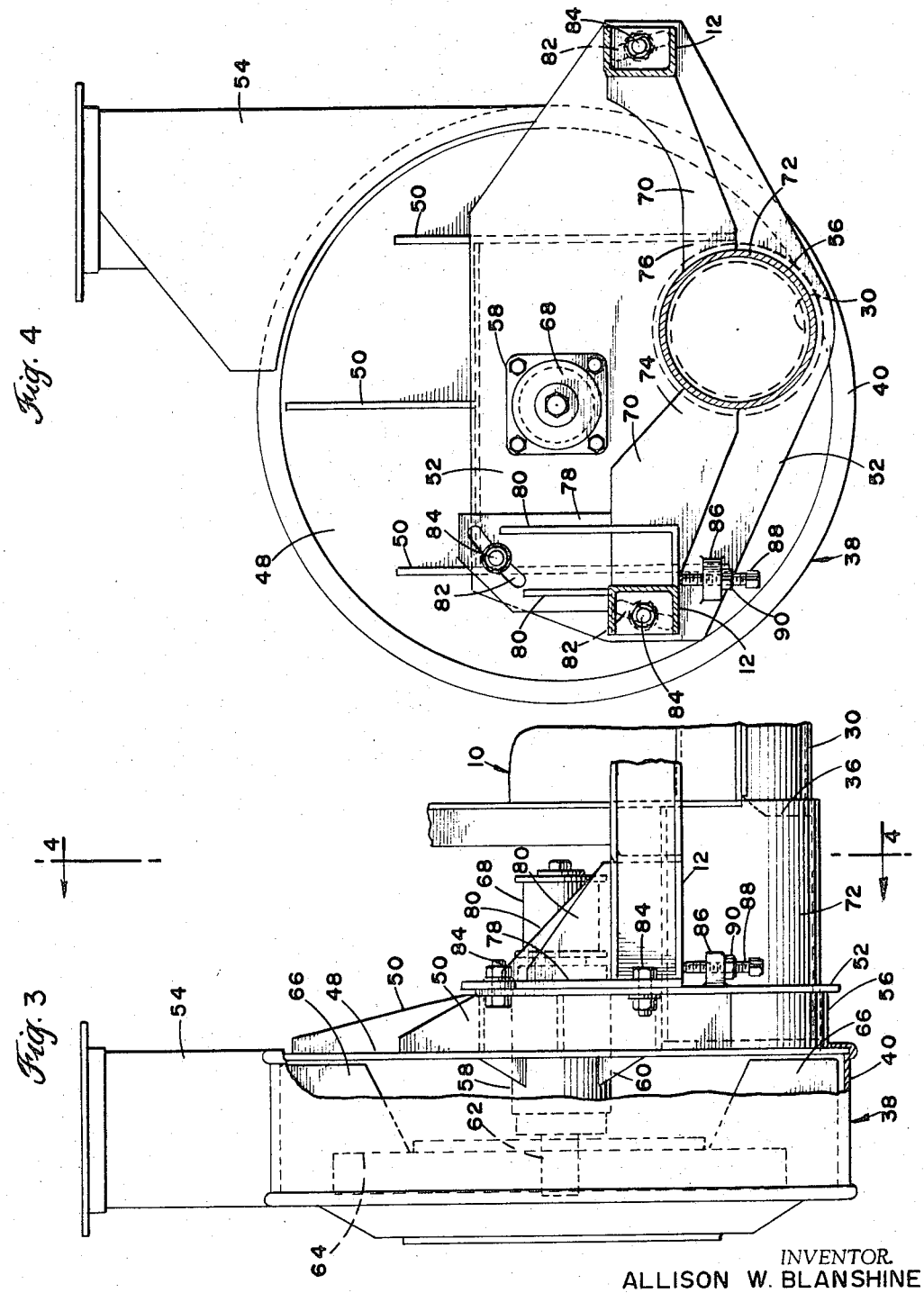

3,401,729
BLOWER ASSEMBLY AND MOUNTING MEANS
Robert E. Wallin, New Holland, Allison W. Blanshine, Lititz, Daniel C. Heitshu, Shippensburg, and Claude K. Focht, New Holland, Pa., assignors to Sperry Rand Corporation, New Holland, Pa., a corporation of Delaware
Filed Aug. 15, 1966, Ser. No. 572,439
7 Claims. (Cl. 146—107)

ABSTRACT OF THE DISCLOSURE

A corn processing machine including frame means, a drive shaft and power means to drive it supported by said frame means, a discharge auger rotatable within a conduit parallel to said drive shaft and spaced therefrom, and a blower assembly having a housing with an inlet coaxially communicating with the discharge end of said conduit and rotatably supported upon said end of said conduit, said blower assembly having a blower fan supported on a shaft parallel to and spaced transversely from said drive shaft and the axis of said conduit, an endless flexible drive member extending around pulley-like means on said fan shaft and drive shaft, and complementary mounting means on said blower assembly and frame means operable to permit limited pivotal movement of said blower assembly about the axis of said conduit to increase the distance between the axes of said drive shaft and fan shaft to increase the tension of said endless flexible drive member therebetween.

---

This invention pertains to the combination of a corn processing machine and a blower assembly adjustably attached to the discharge end thereof and arranged to be operated by drive means comprising part of the processing machine and deriving power therefrom. The blower assembly is for purposes of discharging a comminuted corn product, as produced by said processing machine, in a desired direction to any of a number of means, such as a storage compartment, feed cart, or otherwise.

The corn processing machine to which the present invention pertains has substantial production capacity, whereby the production rate may be reasonably heavy, to such extent that the blower assembly may be subjected to relatively heavy discharge capacities, depending upon the production rate of the machine at any given time. For convenience and compactness, the present invention contemplates driving the rotatable fan means of the blower assembly by endless, flexible belt-like means extending between a driving pulley mounted exteriorly of the corn processing machine and a driven pulley fixed to the shaft of the fan of the blower assembly. Such arrangement is advantageous to permit slippage if jamming conditions occur within the blower assembly, for example, thereby affording safety means to avoid damage to the processing machine and blower assembly under such conditions.

It is the principal object of the present invention to provide complementary mounting means on the frame of the corn processing machine and housing of the blower assembly arranged to permit limited adjustment of the blower housing with respect to the frame in the machine to effect desired tensioning of the drive means for the fan of the blower assembly. It is a further object of the invention to axially center said mounting means about the exit end of discharge auger conduit means on the processing machine through which all of the comminuted corn product is discharged to said blower assembly. A further object of the invention is to provide complementary arcuate slots and clamping bolts in said complementary mounting means of said processing machine and blower assembly which comprise rugged and firm connecting means after desired tensioning of the drive means has been effected with respect to the blower assembly.

Still another object of the invention is to provide mechanically efficient adjusting means in the form of an adjusting screw carried by one of the complementary mounting means for engagement with the other complementary mounting means whereby, simply through rotation of said screw, very precise as well as reasonably powerful adjustment of the housing of the blower assembly with respect to the frame of the corn processing machine can be effected prior to securing the adjusted co-engagement of the mounting means by said clamping bolts relative to the arcuate slots which receive the same.

Details of the invention and of the foregoing objects, as well as other objects thereof, are set forth in the following specification and illustrated in the accompanying drawings comprising a part thereof.

In the drawings:
FIG. 1 is a side elevation of an exemplary corn processing machine to which a blower assembly is attached in accordance with general principles of the present invention.

FIG. 3 is an enlarged side elevation of the blower assembly, partly broken away to show details thereof, showing fragmentarily illustrated portions of the connected blower assembly and corn processing machine, the blower assembly being illustrated in greater detail than in FIG. 1.

FIG. 4 is a vertical elevation, partly in section, of the blower assembly illustrated in FIG. 3 as seen on the line 4—4 of said figure.

Figure 1:
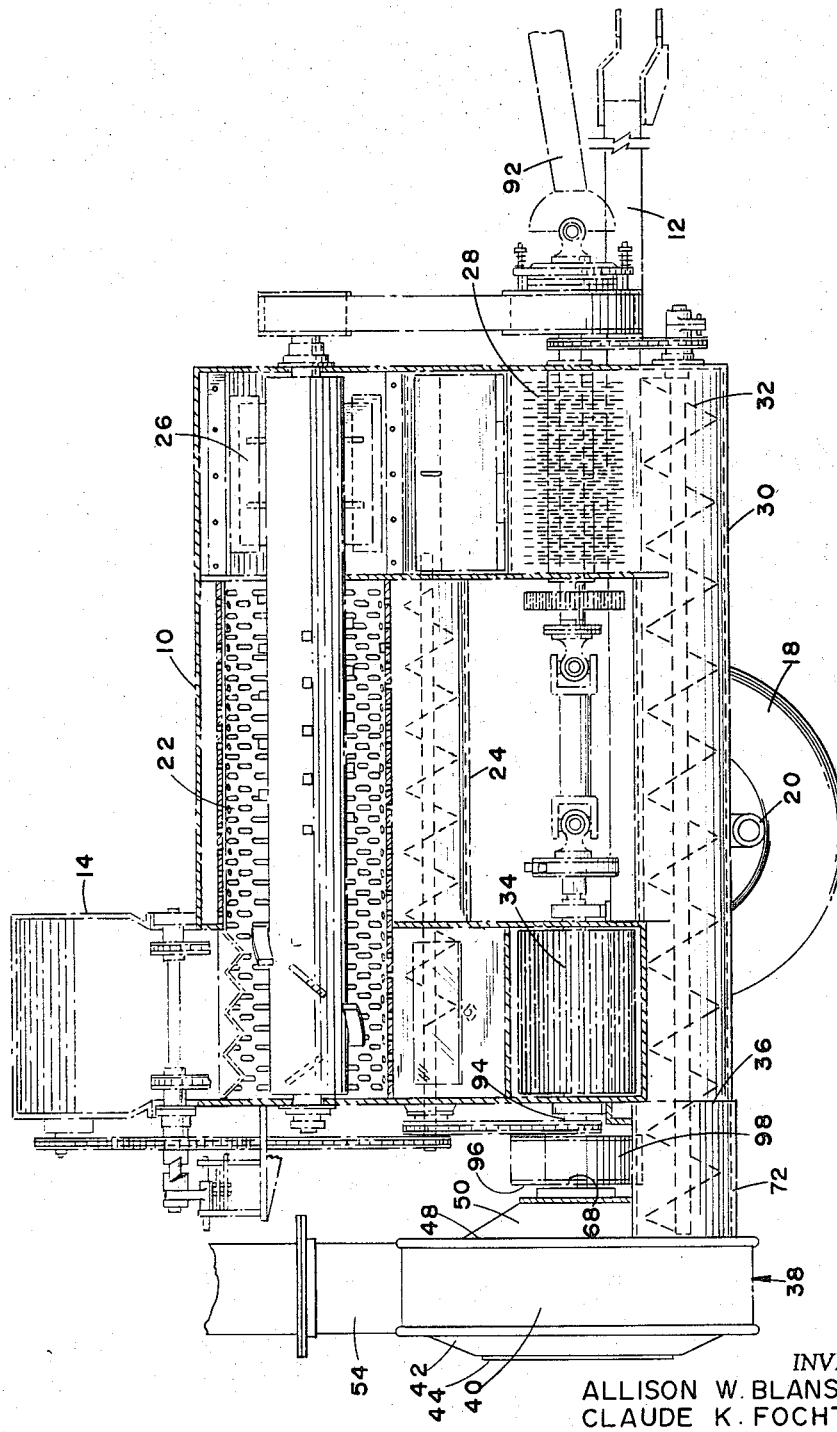
Figure 2:
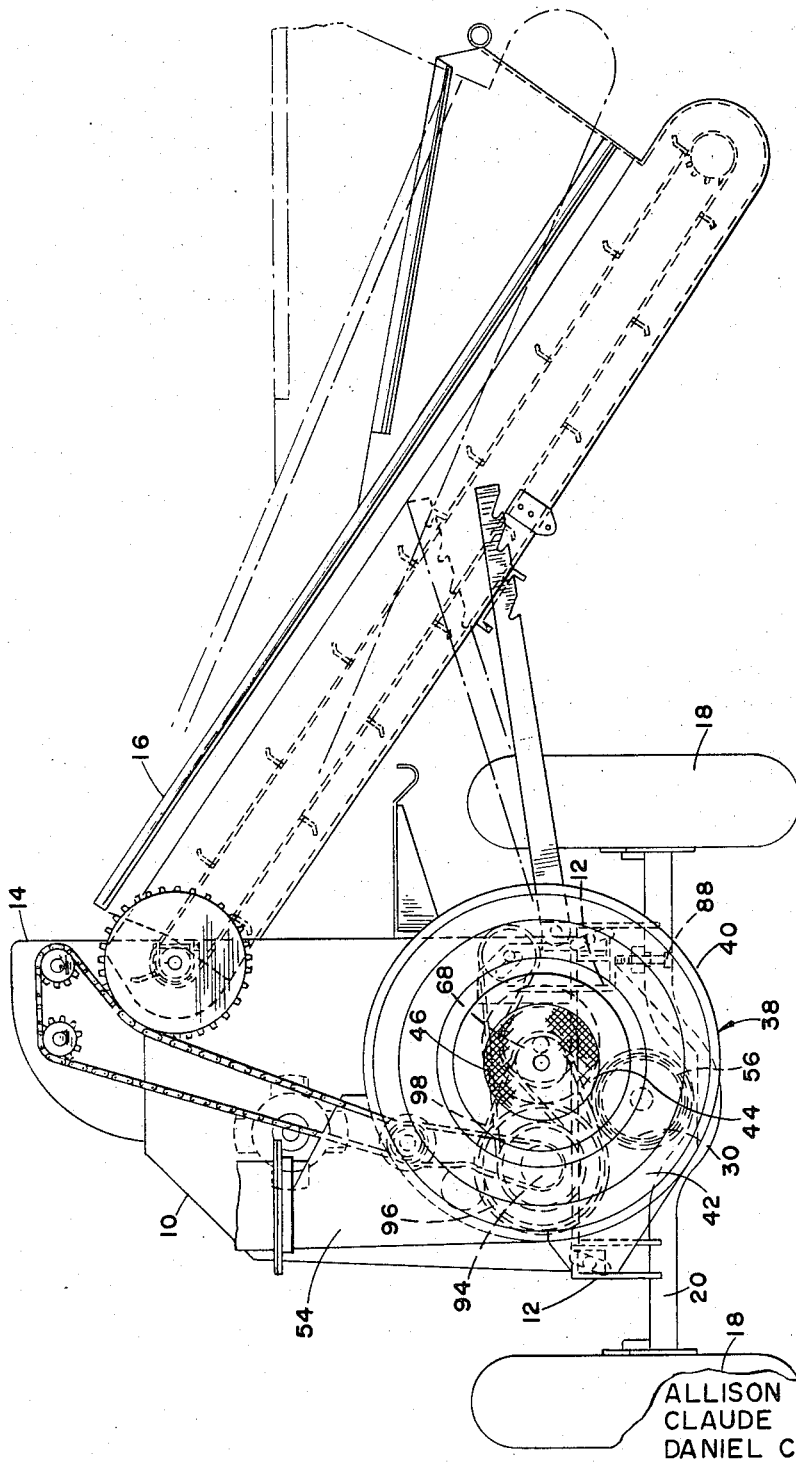
FIG. 2 is an end elevation of the corn processing machine and blower assembly illustrated in FIG. 1 and showing the relationship of drive means between the machine and blower assembly.

The corn processing machine illustrated in FIGS. 1 and 2 embodies a number of cooperating processing mechanisms and units essentially comprising the subject matter of co-pending application Ser. No. 546,280, filed Apr. 29, 1966, and owned by the same assignee as the instant invention. As described in greater detail in said co-pending application, said corn processing machine primarily comprises a housing 10 supported by a frame 12 having inlet means 14 to which ears of corn are delivered by exemplary elevator means 16, the latter being illustrated in FIG. 2. In the preferred construction of the processing machine, it is intended to be portable, though this is not mandatory. As shown in FIGS. 1 and 2, supporting wheels 18 are mounted on an axle 20 to render the machine mobile.

The various processing mechanisms and units within the housing 10 are briefly described to avoid the necessity of reference to said co-pending application, as follows. Ears of corn are delivered through the inlet means 14 to a horizontally extending shelling unit 22. The shelled kernels of corn are discharged through the perforated shell of the shelling unit and fall into upper auger 24, while the stripped cobs proceed to the coarse chopping unit 26, and from there to the lower, finer shredding unit 28, which discharges into the right-hand end of discharge conduit 30, as viewed in FIG. 1, within which discharge auger 32 is rotatable in a direction to move the chopped and shredded cob material to the left as viewed in FIG. 1.

The shelled corn kernels are moved by upper auger 24 toward the left, as viewed in FIG. 1, for discharge into the corn cracking unit 34 which comprises a pair of cooperating cracking rollers having appropriate coacting ribs thereon which crack the kernels of corn and drop the same into tht left-hand end of discharge auger and conduits 30, 32, for mixture with the advancing chopped and shredded cob material. Such intermixed cracked corn kernels and chopped and shredded cob product are discharged toward the left, as viewed in FIG. 1, through the exit end 36 of discharge auger and conduits 30, 32.

As the mixed cracked corn kernel and chopped and shredded cob product is produced by the corn processing machine comprising the various mechanisms and units within housing 10 is produced, it is removed continuously from the machine. It may be discharged to various types of receiving means including storage bins, feed carts by which it may be distributed to cattle and the like, and numerous alternatives. For purposes of effecting and appropriately directing such discharge, the present invention contemplates the use of blower means comprising a blower assembly 38 which comprises a principal part of the present invention and particularly the means by which it is adjustably positionable with respect to the exit or discharge end 36 of the discharge auger and conduit of said processing machine. Details of the blower assembly and the connecting means now will be described.

The blower assembly 38 primarily comprises a short cylindrical housing 40 which may be made of appropriate sheet metal or the like. Said housing also comprises a dish shaped outer cover plate 42, which is annular and preferably bulges outwardly as readily can be seen in FIG. 1, the central portion thereof comprising an inlet opening 44 by which ambient air is introduced to the blower, said opening preferably being covered by a protecting screen 46 shown in FIG. 2.

The housing 40 also comprises an inner, generally circular cover plate 48 shown best in FIGS. 3 and 4, but also shown in FIG. 1, the same being reinforced by a plurality of transversely extending metal ribs 50, shown in the same figures. Said ribs preferably are perpendicular to the plane of cover plate 48. The outer edges thereof are substantially within a common plane and are connected to a preferably planar mounting plate 52 formed from appropriate gauge sheet metal.

The blower housing 40 has a tangentially extending discharge means 54 which, as illustrated in exemplary manner in all figures, extends upwardly. However, it is to be understood that such direction is primarily exemplary and the direction of discharge may be arranged as desired, without restriction to the present illustrations. The blower housing 40 also has an inlet preferably in the form of a cylindrical sleeve 56 which is appreciably offset radially with respect to the central axis of the cylindrical housing 40. The left-hand end of the sleeve 56, as viewed in FIG. 3, is fixed to a complementary opening formed in the cover plate 48 of housing 40, such as by welding or otherwise. Said sleeve also extends through a suitable opening formed in mounting plate 52 and, if desired, said sleeve may be welded to the circumference of said opening to afford rigidity to the entire housing structure.

Centrally of the cover plate 48, a bearing sleeve 58 is mounted, the same extending through an appropriate opening in plate 48 and the bearing sleeve is rendered rigid by means of appropriate radially extending braces 60 which preferably are connected by welding or the like to the exterior of the bearing sleeve 58 and the inner face of cover plate 48, as can best be appreciated from FIG. 3. The sleeve 58 contains an appropriate bearing which is not shown in detail, said bearing rotatably supporting a shaft 62, shown best in FIG. 3, to whch a blower fan 64 is connected, the same having radially extending vanes 66 which are spaced circumferentially in conventional manner. The opposite end of shaft 62 from that which supports the fan 64 projects beyond the outer end of bearing sleeve 58 and supports a driven pulley 68 which is fixedly connected thereto.

The cylindrical sleeve inlet 56 of the blower housing 40 is coaxial with the exit end 36 of discharge conduit 30 and is at least partially coextensive therewith circumferentially. Further, the sleeve 56 is coaxial with the conduit 30 and is at least rotatably movable relative thereto about the common axis of conduit 30 and sleeve 56 for purposes to be described.

By reference to FIGS. 3 and 4, it will be seen that part of the frame 12 of the corn processing machine enclosed within housing 10 extends to the discharge end of said machine and even slightly beyond the exit end 36 of discharge conduit 30 as readily can be seen from FIG. 3. Fixed to the outer ends of the two channel-like frame members 12, such as by welding or the like, is mounting means 70 comprising several somewhat similar members formed from steel plate or the like, which are at least partially coextensive in area with the mounting plate 52 on the blower assembly 38 and complementary thereto for planar, slidably abutting relationship with the outer surface of plate 52, as shown in FIG. 3.

From FIG. 4, it will be seen that the mounting means comprising the plurality of members 70 extend generally horizontally, and adjacent ends thereof are complementary to the exterior of an additional cylindrical sleeve 72 which is coaxial with cylindrical sleeve 56 which extends between cover plate 48 and mounting plate 52. As shown in FIG. 3, wherein substantially more details of the connecting means are shown than in the more general arrangement shown in FIG. 1, one end of said additional cylindrical sleeve 72 is closely fitted coaxially with the sleeve 56 and projects outwardly therefrom, into engagement with mounting plate 52, wherein it is in fixed coaxial registry with the exit end 36 of discharge conduit 30. A short auxiliary extension sleeve 56 constitutes a continuation of fixed sleeve 72 and is slidably movable about the common axis of sleeve 72 and conduit 30 to actually comprise a composite inlet conduit between the housing 48 of blower assembly 38 and the discharge end 36 of discharge conduit 30 of the corn processing machine. Extension sleeve 56 is fixed between cover plate 48 and plate 52, the latter having a hole of corresponding diameter therethrough.

The ends 74 and 76, see FIG. 4, of the horizontal elements of mounting means 70 are complementary to the exterior of additional sleeve 72 and are welded thereto to form a rigid mechanism which is stationary with respect to frame 12 of the processing machine. The associated mounting plate 52 and composite mounting means 70, 78 thus comprise complementary mounting means for connecting said housing of the blower assembly to the processing machine adjacent the discharge end thereof. The mounting means 70 includes a vertical extension 78 which preferably is renderd rigid with respect to frame 12 by means of certain triangular shaped braces 80 which are interconnected to frame 12, as readily can be seen from FIGS. 3 and 4.

For purposes of adjusting the connection between the complementary mounting means 70, 78 upon the processing machine and mounting means 52 upon the blower assembly housing, rotational movement of said blower housing about the axis of the coaxially associated discharge conduit 30 and cylindrical sleeve 72, the outer ends of the oppositely extending mounting means 70 and the upper end of vertical extension 78 is provided with arcuate slots 82, all of which have said common axis of said conduits as a center. Clamping bolts 84 which have appropriate nuts on one end thereof extend through suitable holes in mounting plate 52 which are complementary, in a radial direction, with respect to said common axis relative to the arcuate slots 82. The slots 82 are of sufficient length to permit limited but adequate rotary movement of the entire blower assembly about the axis of the discharge conduit 30 for purposes of producing desired tension in the driving means for the blower assembly details of which are described hereinafter.

Inasmuch as the blower assembly 38, under most circumstances, will be of appreciable size and considerable weight, the present invention comprises means which are readily operable with minimum force to effect a desired, precise adjustment in rotary angular relationship between the blower housing 38 and the frame 12, for example, of the corn processing machine, such adjustment being about the axis of the discharge conduit 30 of said machine. By reference to FIGS. 3 and 4, it will be seen that adjustment producing means is disposed between the mounting plate 52 and frame 12, preferably in the form of a threaded lug 86 which is fixed to the outer surface of mounting plate 52, and an adjusting screw or bolt 88 which is threaded through lug 86 and also is provided with a lock nut 90 thereon.

The upper end of bolt 88 engages the lower surface of one of the channel frame members 12, as readily can be seen from FIGS. 3 and 4. Upon loosening the nuts on clamping bolts 84 and after the locking nut 90 has been backed-off on the bolt 88, for example, when the bolt 88 is threaded upwardly, as viewed in said figures, the blower assembly 38 will be moved counter-clockwise, as viewed in FIG. 4, about the axis of discharge conduit 30. Upon reaching a desired counter-clockwise adjusted position under such circumstances, the rotation of adjusting bolt 88 is stopped, lock nut 90 is threaded into engagement with the lug 86 and clamping bolts 84 are tightened with respect to the nuts thereon to effectively and firmly secure the blower assembly 38 in desired operative position with respect to the processing machine.

As has been indicated hereinabove, such adjustable positioning of the blower assembly 38 with respect to the processing machine primarily is for purposes of tensioning the drive means between the two. Referring particularly to FIGS. 1 and 2, wherein certain details of the corn processing machine are illustrated to a limited extent, it will be seen that power is furnished to the processing machine by any suitable means such as a drive shaft 92 which may derive power from a p.t.o. on a tractor, for example, or any other suitable means. Through appropriate clutch means, intermediate drive shifts, universal joints, and the like, it will be seen from FIG. 1 that a driven shaft 92 at the left-hand end of the corn cracking unit 34 has a relatively large drive pulley 96 fixed thereto. Both the shaft 94 and pulley 96 are shown somewhat diagrammatically in FIG. 2, as well as driven pulley 68 on the blower fan shaft likewise being similarly illustrated therein. It will also be seen from this figure that the axis of driven pulley 68 is transversely offset an appreciable distance from the axis of shaft 94 and pulley 96 and both axes are appreciably above the axis of discharge conduit 30.

Approximate endless flexible drive means is non-restrictively illustrated in the form of an exemplary belt 98 which extends around the drive pulley 96 and driven pulley 68 to establish driving relationship therebetween. In the event the belt 98 does not exert sufficient tension and corresponding friction between the pulleys, or equivalent means, around which it extends, it will be seen, especially from FIG. 2, that if the tension-adjusting bolt 88 is backed off from engagement with the frame member 12, it will be possible to move the blower assembly 38 about the axis of the discharge conduit 30, in a clockwise direction as viewed in FIG. 2, thereby increasing the tension upon the belt 98. Such movement of the blower assembly may be achieved manually by exerting pressure upon the discharge conduit 54 on the upper left corner thereof of blower housing 40, as viewed in FIG. 2, for example. Following this, the clamping bolts 84 may be tightened to secure the desired adjusted tension thus obtained. From FIG. 2, it will be seen the center of gravity of blower assembly 38 is offset from the axis of rotation about conduit 30, whereby the weight of the blower assembly assists in effecting such tensioning movement. If desired, the adjusting bolt 88 may be moved upwardly into engagement with the frame member 12 after the foregoing operation to additionally establish desired fixed positioning of the lower assembly with respect to the corn processing machine.

Conversely to what has been described above, in the event it is found the tension exerted by belt 98 is too great, it is only necessary to slightly loosen the clamping bolts 84, move the upper end of adjusting bolt 88 upwardly to effect upward movement of housing 40 relative to the right-hand frame member 12 as viewed in FIG. 2 and thus pivotally move the blower assembly a limited amount about the axis of the discharge conduit 30, until the desired tension is established. Then the clamping bolts 84 are tightened to secure the finally adjusted position thus achieved.

While this invention has been described and illustrated in its several preferred embodiments, it should be understood that the invention is not to be limited to the precise details herein illustrated and described since the same may be carried out in other ways falling within the scope of the invention as claimed.

Having thus described our invention, what we claim is:

1. A corn processing machine comprising frame means and processing mechanism supported by said frame means and operable to form a comminuted product, said machine including a drive member rotatably supported by said frame and a discharge auger rotatable within a conduit arranged to receive said corn product from said processing mechanism of said machine and having a discharge exit fixed relative to said frame, in combination with a blower assembly operable to receive said comminuted corn product and discharge it in a desired direction from said housing by an air current developed by said blower assembly when operating, said blower assembly comprising a housing having discharge means and an inlet, said inlet being positioned coaxially in communication with the discharge exit of said auger conduit, a blower fan rotatably supported within said housing, a rotatable drive shaft for said fan projecting therefrom through said housing, said drive shaft being parallel to and spaced from said drive member of said machine and the axis of said auger conduit, endless flexible drive means extending commonly around said drive means for said fan and said drive member of said processing machine to effect driving connection of said fan to said machine, and complementary mounting means on said blower housing and frame adjustably coengageable to support said blower assembly upon said processing machine, said mounting means being arranged to permit limited pivotal movement of said blower housing about the axis of said discharge auger conduit to vary the distance transversely between said blower drive means and drive member of said machine to provide desired adjustable driving tension between the same and said flexible drive means extending therearound.

2. The corn processing machine and blower assembly according to claim 1 in which said complementary mounting means comprises parallel plate-like members respectively carried by said housing of said blower assembly and the frame of said corn processing machine.

3. The corn processing machine and blower assembly according to claim 1 further including a sleeve on said blower housing projecting transversely thereto and being coaxially complementary to said discharge auger conduit of said processing machine and movably engaging the same for limited rotation about the axis thereof to guide the adjustable positioning of the housing of said blower assembly relative to said discharge auger conduit of said corn processing machine.

4. The corn processing machine and blower assembly according to claim 3 in which the axis of said rotatable drive means for said fan is offset transversely to the axis of said discharge auger conduit and both of said axes being radially offset relative to the axis of said discharge auger conduit.

5. The corn processing machine and blower assembly according to claim 3 in which slots are formed in one of said complementary mounting means and clamping bolts are connected to said other complementary mounting means and extend through said slots, said clamping bolts being operable to secure said complementary mounting means in desired adjusted relationship with respect to each other.

6. The corn processing machine and blower assembly according to claim 5 in which said complementary mounting means are plate-like and parallel to each other and said arcuate slots have centers coinciding with the axis of said discharge auger conduit.

7. The corn processing machine and blower assembly according to claim 6 further including a positioning screw fixed relative to one of said complementary mounting means and engageable with said other complementary mounting means, said positioning screw being operable to move said blower housing a limited distance about the axis of said discharge auger conduit to effect desired relative positioning of the blower fan axis thereof with respect to the axis of the drive means on said corn processing machine to effect desired tensioning of said guide means extending therebetween.

References Cited

UNITED STATES PATENTS

| 826,459 | 7/1906 | Wilder | 146—107 |
| 3,186,460 | 6/1965 | Frederick | 146—107 |

W. GRAYDON ABERCROMBIE, *Primary Examiner.*